(12) United States Patent
Calderas et al.

(10) Patent No.: US 6,294,214 B1
(45) Date of Patent: *Sep. 25, 2001

(54) NONCARBONATED BEVERAGE PRODUCTS WITH IMPROVED MICROBIAL STABILITY AND PROCESSES FOR PREPARING

(75) Inventors: Jonathan Javier Calderas; Thomas Ray Graumlich; Leonard Jenkins; Robert Phillip Sabin, all of Cincinnati, OH (US)

(73) Assignee: The Procter & Gamble Co., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/892,378

(22) Filed: Jul. 14, 1997

Related U.S. Application Data

(63) Continuation of application No. 08/642,795, filed on May 3, 1996, now abandoned, which is a continuation-in-part of application No. 08/385,012, filed on Feb. 7, 1995, now abandoned, which is a continuation-in-part of application No. 08/201,300, filed on Feb. 24, 1994, now Pat. No. 5,431,940.

(51) Int. Cl.$^7$ ............................................. A23L 2/44
(52) U.S. Cl. .................. 426/330.3; 426/66; 426/330.5; 426/548; 426/597; 426/599
(58) Field of Search ................... 426/330.3, 66, 426/330.5, 548, 597, 599

(56) References Cited

U.S. PATENT DOCUMENTS

| | | |
|---|---|---|
| 3,404,987 | 10/1968 | Kooistra et al. . |
| 3,681,091 | 8/1972 | Kohl et al. ............................. 99/150 |
| 3,681,987 | 8/1972 | Kohl et al. . |
| 4,717,579 | 1/1988 | Vietti et al. . |
| 4,748,033 | 5/1988 | Syfert et al. . |
| 5,021,251 | 6/1991 | McKenna et al. . |

FOREIGN PATENT DOCUMENTS

| | | |
|---|---|---|
| 1792760 | 5/1974 | (DE) . |
| 1642141 | 4/1976 | (DE) . |
| 1242105 | * 7/1986 | (SU) ........................................ 426/66 |
| 95/22910 | 8/1995 | (WO) . |
| 677801 | 6/1968 | (ZA) . |
| 677805 | 6/1968 | (ZA) . |

OTHER PUBLICATIONS

Jacobs, M. 1959. Manufacture and Analysis of Carbonated Beverages, Chemical Publishing Co., Inc. New York, N.Y. p. 95 & 96.*

Furia, T., *CRC Handbook of Food Additives*, 2d Edition, vol. 1, CRC Press (1972), p. 628.

R. B. Tompkin, Indirect Antimicrobial Effects in Foods: Phosphates, *Journal of Food Safety* 6 (1983), pp. 13–27.

R. H. Ellinger, Phosphates in Food Processing, *Handbook of Food Additives*, 2d Edition, CRC Press (1972), pp. 644–780.

Antimicrobial Agents (Preservatives), *The Food Additives Market*, Frost & Sullivan, Inc. (1975), pp. 68–85.

J. Sofos, *Sorbate Food Preservatives* (1989), pp. 75–76.

Davidson and Juneja, Antimicrobial Agents, *Food Additives* (1990), pp. 88–137.

J. Falbe (ED) et al., "Rompp, Cemie Lexikon"; 1992, George Thieme Verlag, Stuttgard—New York; 9th Edition, vol. 5, pp. 3564–3565; see "Polyphosphate".

R. B. Tompkin, Indirect Antimicrobial Effects in Foods: Phosphates, *Journal of Food Safety* 6 (1983) pp. 13–27.

R. H. Ellinger, Phosphates in Food Processing, *Handbook of Food Additives*, 2nd ed. 1972, CRC Press, pp. 644–780.

Antimicrobial Agents (Preservatives), *The Food Additives Market*, (Frost & Sullivan, Inc. 1975), pp. 68–85.

J. Sofos, *Sorbate Food Preservatives*, (1989) pp. 75–76.

Davidson and Juneja, Antimicrobial Agents, *Food Additives* (1990), pp. 83–137.

* cited by examiner

*Primary Examiner*—Helen Pratt
(74) *Attorney, Agent, or Firm*—Kelly L. McDow-Dunham; Tara M. Rosnell; Carl J. Roof

(57) ABSTRACT

The noncarbonated beverage products have a pH of between 2.5 and 4.5 and contain from about 300 ppm to about 3000 ppm of a polyphosphate; from about 100 ppm to about 1000 ppm of a preservative such as sorbic acid, benzoic acid, alkali metal salts thereof and mixtures thereof; from about 0.1% to about 40% by weight of fruit juice; and from about 80% to about 99% by weight of added water, the added water contains from 0 ppm to about 60 ppm of hardness, and preferably contains from 0 ppm to about 300 ppm of alkalinity. These noncarbonated beverage products can be stored at ambient temperatures for at least about 10 days, without substantial microbial proliferation therein after exposure to beverage spoilage organisms.

22 Claims, No Drawings

NONCARBONATED BEVERAGE PRODUCTS WITH IMPROVED MICROBIAL STABILITY AND PROCESSES FOR PREPARING

This application is a continuation of 08/642,795, filed May 3, 1996, now abandoned, which is a continuation in part of copending application Ser. No. 08/201,300, filed Feb. 24, 1994 now U.S. Pat. 5,431,940, issued Jul. 11, 1995.

FIELD OF THE INVENTION

The present invention relates to noncarbonated beverage products with improved microbial stability. Such stability is provided primarily by a novel combination within the beverage products of a polyphosphate, a preservative and water of a specified hardness, and preferably of a specified alkalinity.

BACKGROUND OF THE INVENTION

Controlling microbial growth in noncarbonated dilute juice beverages is an ongoing concern among beverage manufacturers. Such beverage products, when exposed to food spoilage microorganisms, provide an excellent environment for rapid microbial growth. Such exposure can, and infrequently does, result from accidental inoculation of the beverage products during manufacturing or packaging. Food spoilage microorganisms can then rapidly proliferate by feeding on nutrients provided by the fruit juice component of the noncarbonated dilute juice beverages.

Of course, microbial proliferation in noncarbonated dilute juice beverages will not occur without the requisite product exposure to yeast or bacteria. Manufacturing and packaging operations directed to the prevention of such exposure is preferred, but provisions are often made for any infrequent accidental exposure to the isolated beverage product. Such provisions are directed to limiting or preventing subsequent microbial proliferation to thus limit or prevent food spoilage.

Subsequent microbial proliferation in noncarbonated dilute juice beverages can be controlled to some extent by maintaining the beverages in cold storage, e.g., less than about 10° C. Microbial proliferation in noncarbonated dilute juice beverages can also be controlled or limited to some extent by manufacturing and storing the beverages as frozen concentrates. Microbial proliferation is further inhibited in frozen concentrates by even lower storage temperatures and by reduced water activity in the concentrate. However, whether refrigerated as a noncarbonated dilute juice beverage or stored as a frozen concentrate, such beverages still require cold storage which is much more expensive than storage under ambient conditions. Moreover, there is limited cold storage space in retail stores in which such noncarbonated dilute juice beverages or frozen concentrates can be stored.

Beverage products which can be maintained under ambient conditions, e.g. at about 20° C., are more preferred than chilled beverages or frozen concentrates from a storage cost standpoint. However, ambient temperatures promote subsequent microbial proliferation in noncarbonated dilute juice beverages.

Beverage products can be maintained under ambient conditions provided that such beverages are heat pasteurized during packaging (hot packing) or are packaged under completely aseptic conditions (aseptic packaging). Hot packing involves pasteurization of the beverage and its container such that the resulting sealed beverage product contains no food spoilage microorganism. Likewise, packaging under completely aseptic conditions will produce a beverage product completely free of food spoilage microorganisms. Accordingly, these beverage products can be stored under ambient conditions since there are assuredly no food spoilage microorganisms therein to feed on the beverage nutrients and rapidly proliferate.

Aseptic packaging methods, however, are often unsuitable for manufacturing beverages products packaged in certain beverage containers, e.g., rigid containers such as glass and cans. An aseptic or sterile environment is difficult to maintain during aseptic packaging operations. Frequent cleaning of the packaging line is necessary which is time consuming, expensive and is too frequently ineffective in preventing microbial contamination.

Hot packing methods are likewise unsuitable for manufacturing certain types of beverage products. This well known method involves heat pasteurization of the juice beverage during packaging at temperatures of between about 85°–105° C. This method is commonly utilized in the manufacture of canned or bottled (glass) beverages. However, not all beverage containers can withstand heat-pasteurization during packaging. For example, flexible containers made from high density polyethylene, which have become more popular with consumers, should not be subjected to the pasteurization temperatures utilized during hot packing operations.

Preservatives have been used in noncarbonated dilute juice beverages to provide some degree of microbial inhibition. Preservatives commonly used in beverage products include, for example, sorbates, benzoates, organic acids, and combinations thereof. However, such preservatives often contribute an off-flavor to the beverage products when used at the levels necessary to inhibit subsequent microbial proliferation at ambient temperatures. Moreover, when used at concentrations sufficiently low to avoid off-flavor development, such preservatives have heretofore been unable to effectively inhibit the growth of many preservative resistant spoilage microorganisms.

Accordingly, most noncarbonated dilute juice beverages are hot packed in cans or glass bottles, aseptically packaged, or they are maintained in cold storage until consumed.

The foregoing considerations involving the effective inhibition of subsequent microbial proliferation in noncarbonated dilute juice beverage products indicates that there is a continuing need to identify noncarbonated dilute juice beverage products that can be manufactured without the use of hot packing or aseptic packing operations, and that can be stored at ambient temperatures without the use of excessive concentrations of preservatives. Accordingly, it is an object of the present invention to provide such noncarbonated dilute juice beverage products and processes for preparing them, and further to provide such beverage products which can be maintained at ambient temperatures for at least about 10 days, preferably for at least about 20 days, without substantial microbial proliferation therein.

SUMMARY OF THE INVENTION

The present invention is directed to noncarbonated dilute juice beverage products that can be stored at ambient temperatures for at least about 10 days without substantial microbial proliferation secondary to product exposure to preservative resistant beverage spoilage microorganisms. The beverage products do not require hot packing, aseptic packing or the incorporation of excessive amounts of preservatives to provide the requisite inhibition of microbial proliferation during storage.

Essential elements of the noncarbonated beverage products of the present invention include from about 100 ppm to about 1000 ppm of a preservative selected from the group consisting of sorbic acid, benzoic acid, alkali metal salts thereof and mixtures thereof; from about 0.1% to about 40% by weight of fruit juice; and from about 300 ppm to about 3000 ppm of a polyphosphate having the formula

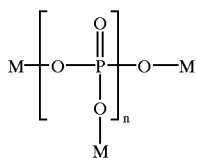

where n averages from about 3 to about 100 and each M is independently selected from the group of sodium and potassium atoms. The noncarbonated beverage products further comprise from about 80% to about 99% added water by weight of the beverage products, wherein the added water contains from 0 ppm to about 60 ppm of hardness, and preferably from 0 ppm to about 300 ppm of alkalinity. The noncarbonated beverage products have a pH of from about 2.5 to about 4.5 and an ambient display time of at least about 10 days.

It was found that control of water hardness, and to some extent control of water alkalinity, are essential in the noncarbonated beverage products herein in order to allow the preservative system to effectively inhibit subsequent microbial proliferation for at least about 10 days at ambient temperatures. These noncarbonated beverage products can therefore be displayed on supermarket shelves at ambient temperatures for at least about 10 days, typically for between about 10 and about 20 days, more typically for at least about 20 days, without the need for costly and limited cold storage space, and without the need for aseptic or hot packing manufacturing methods.

DETAILED DESCRIPTION OF THE INVENTION

As used herein, "microbial proliferation" means a 100 fold increase or greater in the number of beverage spoilage microorganisms in a noncarbonated beverage product after an initial contamination level of about 10 cfu/ml.

As used herein, "ambient display time" means the period of time during which a noncarbonated beverage product at 20° C. can effectively resist microbial proliferation following a 10 cfu/ml contamination with beverage spoilage microorganisms.

As used herein, the term "comprising" means various components can be conjointly employed in the preparation of the noncarbonated beverage products of the present invention.

As used herein "noncarbonated beverage products" means beverage products which contain less than one volume of carbonation.

All weights, parts and percentages used herein are based on weight unless otherwise specified.

Preparation of the noncarbonated beverage products of the present invention is described in detail as follows.

Preservative System

The noncarbonated beverage products of the present invention comprise a preservative system containing a preservative and a food grade polyphosphate. The preservative system is described in detail as follows.

Specifically, the beverage products herein comprise from about 100 ppm to about 1000 ppm, preferably from about 200 ppm to about 1000 ppm, more preferably from about 400 ppm to about 1000 ppm and most preferably from about 650 ppm to about 750 ppm, of a preservative selected from the group consisting of sorbic acid, benzoic acid, alkali metal salts thereof, and mixtures thereof. The preservative is preferably selected from the group consisting of sorbic acid, potassium sorbate, sodium sorbate and mixtures thereof. Most preferred is potassium sorbate.

The noncarbonated beverage products further comprise a food grade polyphosphate for use in combination with the preservative. Specifically, the beverage products comprise from about 300 ppm to about 3000 ppm, preferably from about 900 to about 3000 ppm, more preferably from about 1000 ppm to about 1500 ppm, of a polyphosphate characterized by the following structure:

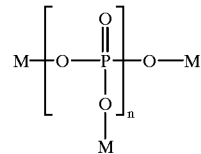

where n averages from about 3 to about 100, preferably from about 13 to about 16, and where each M is independently selected from the group of sodium and potassium atoms. Especially preferred is sodium hexametaphosphate, a straight chain polyphosphate where n averages about 16, and each M is a sodium atom.

It was found that these straight chain polymeric phosphates exhibit better antimicrobial activity in the noncarbonated beverage products of the present invention than other food grade phosphates. Well known food grade phosphates include, for example, orthophosphate, cyclic polyphosphates, monobasic calcium phosphate, dipotassium phosphate, disodium phosphate, sodium phosphate, sodium pyrophosphate, sodium metaphosphate and tetrasodium pyrophosphate.

The polyphosphates for use in the noncarbonated beverage products herein and the selected preservatives also for use in the beverage product herein act synergistically, or at least additively, to inhibit microbiological growth in the beverage products of the present invention. This combination in the beverage products herein is particularly effective in inhibiting yeast, including preservative resistant *Zygosaccharomyces bailii*, and acid tolerant preservative resistant bacteria.

The use of sorbates, benzoates and mixtures thereof as preservatives in beverage products is well known, as is the mechanism by which such preservatives inhibit microbial growth in food products generally. Sorbates and benzoates are described, for example, by Davidson and Branen, *Antimicrobials in Foods,* Marcel Dekker, Inc., pp 11–94 (2nd ed. 1993), which description is incorporated herein by reference.

The use of straight chain polyphosphates, alone or in combination with preservatives, to inhibit microbial growth in food products is also well known. Polyphosphates are described, for example, in *Handbook of Food Additives,* CRC Press, pp 643–780 (2nd ed.1972), which description is incorporated herein by reference. Moreover, the synergistic or additive antimicrobial effect from phosphates combined with a preservative (e.g., sorbates, benzoates, organic acids) in food products is disclosed in U.S. Pat. No. 3,404,987 to Kooistra et al.

Although the use of the above described polyphosphates and preservatives, alone or in combination, do provide some degree of antimicrobial activity in beverage products, the novel beverage product of this invention described hereinafter shows outstanding antimicrobial activity against microorganisms commonly associated with the spoilage of beverage products, especially preservative resistant spoilage microorganisms. The antimicrobial efficacy of this novel noncarbonated beverage product, which involves an added water component of certain hardness, and preferably of a certain alkalinity, in combination with the preservative system described herein, is surprisingly superior to comparable noncarbonated beverage products containing water of typical hardness and alkalinity.

Hardness and Alkalinity

As stated hereinbefore, a key aspect of the beverage products of the present invention is the incorporation of an added water component with controlled hardness, and preferably of controlled alkalinity. This added water component of the beverage products is described in detail as follows.

Specifically, the beverage products of the present invention comprises from about 80% to about 99% by weight of water, more typically from about 85% to about 93% by weight of water. It is primarily the hardness of this water component that, when used in conjunction with the preservative system described hereinbefore, provides for the surprisingly improved antimicrobial effect in the noncarbonated beverage product herein. In addition to controlled hardness, controlled alkalinity of the added water provides marginal improvement in antimicrobial effects.

The term "hardness" as used herein refers to the presence of calcium and magnesium cations in water, generally. For purposes of the present invention, hardness of the added water component is calculated according to Association of Official Analytical Chemists (AOAC) standards set forth in *Official Methods of Analysis*, published by the AOAC, Arlington, Va., pp 627–628 (14th ed. 1984), which is incorporated herein by reference. Under AOAC standards, hardness is the sum of $CaCO_3$ equivalents (mg/L) in water, which sum is obtained by multiplying the concentrations (mg/L) found of the following cations in the water by the factors.

TABLE 1

| Cation | Factor |
|--------|--------|
| Ca | 2.497 |
| Mg | 4.116 |
| Sr | 1.142 |
| Fe | 1.792 |
| Al | 5.564 |
| Zn | 1.531 |
| Mn | 1.822 |

Compounds that impart hardness to water are primarily magnesium and calcium carbonates, bicarbonates, sulfates, chlorides and nitrates, although other compounds which can contribute polyvalent cations to water can also impart hardness. Water based on hardness is normally classified as soft (0–60 ppm), moderately hard (61–120 ppm), hard (121–180 ppm) and very hard (over 180 ppm).

The term "alkalinity" as used herein refers to the presence of carbonate and bicarbonate anions in water, generally. For purposes of the present invention, alkalinity of the added water component is measured according to AOAC standards set forth in Official Methods of Analysis, published by the AOAC, Arlington, Va., pp 618–619 (14th ed. 1984), which is incorporated herein by reference. The standard AOAC Titrimetric Method for measuring hardness can involve automatic titrators and pH meters, suitably calibrated, or visual titration. Alkalinity is then calculated and expressed as $CaCO_3$ (mg/L) equivalents in the added water component. Compounds that impart alkalinity to water include carbonate, bicarbonate, phosphate, hydroxide and silicate salts of potassium, sodium, calcium and magnesium.

For purposes of defining the beverage products herein, the added water component does not include water incidentally added to the beverage product via other added materials such as, for example, the fruit juice component The added water component of the beverage product must comprise from 0 ppm to about 60 ppm, preferably from about 0 ppm to about 30 ppm, of hardness. Excessively hard water can be treated or softened by known and conventional methods to reduce hardness levels to appropriate levels. This treated water can then be used as the added water component of the beverage product. A suitable method for softening the added water component herein involves treating the water with $Ca(OH)_2$. This well known method is most suitable and economical for water having an initial hardness of 100–150 ppm as calcium carbonate. This softening method is not efficient with raw waters with less than about 100 ppm of hardness.

Another suitable method for softening the added water component herein involves ion-exchange operations. This well known method can be used to treat water having an initial hardness of 50–100 ppm. Such ion-exchange operations are in wide application both for the home and industry. Other methods for controlling hardness of the added water component herein can also be used.

The added water component herein preferably comprises from 0 ppm to about 300 ppm, more preferably from about 0 ppm to about 60 ppm, of alkalinity. Alkalinity can be adjusted to the preferred level by known or conventional water treatment methods. Suitable methods for adjusting hardness and alkalinity of the added water component are described, for example, by Woodroof and Phillips, Beverages: *Carbonated & Noncarbonated*, AVI Publishing Co., pp 132–151 (rev. ed. 1981), and also by Thorner and Herzberg, *Non-alcoholic Food Service Beverage Handbook*, AVI Publishing Co., pp 229–249 (2nd ed. 1978), both descriptions being incorporated herein by reference.

It is important that the hardness, and preferably the alkalinity, of the added water component be within the ranges described hereinabove. It was found that the preservative system described herein does not, by itself, sufficiently inhibit the subsequent proliferation of yeast and acid tolerant preservative resistant bacteria. We found, however, that this same preservative system when combined with the above recited water quality controls, will inhibit this subsequent microbial proliferation in the noncarbonated beverage products for up to at least 10 days, typically for at least about 20 days.

Methods for measuring ambient display times and subsequent microbial proliferation in the noncarbonated beverage product of the present invention are described hereinafter.

Fruit Juice

An important element of the beverage product of the present invention is fruit juice which can provide flavor and nutrition. However, it is this element of most beverage products that also provides an excellent medium on which beverage spoilage microorganisms can feed and rapidly proliferate. It is therefore this fruit juice component of the noncarbonated beverage product herein that necessitates the use of the preservative system and water quality controls described hereinbefore.

Specifically, the noncarbonated beverage product of the present invention comprises from 0.1% to about 40%, preferably from 0.1% to about 20%, more preferably from about 0.1% to about 10%, most preferably from about 3% to about 6%, by weight of a fruit juice (weight percentage based on single strength 2–16° Brix fruit juice). The fruit juice can be incorporated into the beverage product as a puree, comminute or as a single strength or concentrated juice. Especially preferred is the incorporation of the fruit juice as a concentrate with a solid content (primarily as sugar solids) of between about 20° and 80° Brix.

Subsequent microbial proliferation in the noncarbonated beverage product herein cannot be effectively inhibited at ambient temperatures if fruit juice concentrations exceed about 10% by weight of the beverage products. At fruit juice concentrations less than about 0.1% by weight of the beverage product, the need for stringent antimicrobial systems is less. Even within the fruit juice concentrations of the beverage product herein (between about 0.1% and about 10%), ambient display times will increase with decreased percentages of fruit juice in the beverage product, such that low fruit juice concentrations correlate with ambient display times exceeding about 20 days, while higher fruit juice concentrations tend to correlate with ambient display times of between about 10 and 20 days. Variations in the concentration of preservative and polyphosphate within the ranges described hereinbefore can also impact ambient display times. Nonetheless, so long as the concentration of fruit juice, preservative, polyphosphate, water hardness (and preferably water alkalinity) are within the ranges recited herein for the beverage products, ambient display times will be at least about 10 days.

The fruit juice in the noncarbonated beverage products can be any citrus juice, non-citrus juice, or mixture thereof, which are known for use in beverage products Examples of such fruit juices include, but are not limited to, non-citrus juices such as apple juice, grape juice, pear juice, nectarine juice, currant juice, raspberry juice, gooseberry juice, blackberry juice, blueberry juice, strawberry juice, custard-apple juice, pomegranate juice, guava juice, kiwi juice, mango juice, papaya juice, watermelon juice, cantaloupe juice, cherry juice, cranberry juice, pineapple juice, peach juice, apricot juice, plum juice and mixtures thereof, and citrus juices such as orange juice, lemon juice, lime juice, grapefruit juice, tangerine juice and mixtures thereof. Other fruit juices, and nonfruit juices such as vegetable or botanical juices, can be used as the juice component of the noncarbonated beverage products of the present invention.

Acidity

The noncarbonated beverage products of the present invention have a pH of from about 2.5 to about 4.5, preferably from about 2.7 to about 3.5. This pH range is typical for noncarbonated dilute juice beverage products. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression.

Tea Solids

The noncarbonated beverage products herein can comprise tea solids. The tea solids can be incorporated into the beverage product in addition to, or in place of, the fruit juice component described hereinbefore.

Specifically, the noncarbonated beverage products can comprise from 0 to about 0.25%, preferably from about 0.02% to about 0.25%, more preferably from about 0.7% to about 0.15%, by weight of tea solids. The term "tea solids" as used herein means solids extracted from tea materials including those materials obtained from the genus Camellia including $C.$ $sinensis$ and $C.$ $assaimica$, for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials which are related and which have not undergone substantial fermentation to create black teas. Members of the genus Phyllanthus, catechu gambir and Uncaria family of tea plants can also be used. Mixtures of unfermented and partially fermented teas can be used.

Tea solids for use in the noncarbonated beverage products herein can be obtained by known and conventional tea solid extraction methods. Tea solids so obtained will typically comprise caffeine, theobromine, proteins, amino acids, minerals and carbohydrates.

Sweetener

The noncarbonated beverage products of the present invention can, and typically will, contain an artificial or natural, caloric or noncaloric, sweetener. Preferred are carbohydrate sweeteners, more preferably mono- and or di-saccharide sugars.

Specifically, the noncarbonated beverage products will typically comprise from about 0.1% to about 20%, more preferably from about 6% to about 14%, sugar solids by weight of the beverage products. Suitable sweetener sugars include maltose, sucrose, glucose, fructose, invert sugars and mixtures thereof. These sugars can be incorporated into the beverage products in solid or liquid form but are typically, and preferably, incorporated as a syrup, more preferably as a concentrated syrup such as high fructose corn syrup. For purposes of preparing the beverage products of the present invention, these optional sweeteners can be provided to some extent by other components of the beverage products such as the fruit juice component, optional flavorants, and so forth.

Preferred carbohydrate sweeteners for use in the beverage products are sucrose, fructose and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose.

Optional artificial or noncaloric sweeteners for use in the noncarbonated beverage product include, for example, saccharin, cyclamates, acetosulfam, L-aspartyl-L-phenylanaine lower alkyl ester sweeteners (e.g., aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-1-hydroxymethyl-alkaneamide sweeteners disclosed in U.S. Pat. No. 4,338,346 to Brand, L-aspartyl-1-hydroxyethylakaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred sweetener is aspartame.

Other Ingredients

The noncarbonated beverage products herein can further comprise any other ingredient or ingredients typically used as optional beverage ingredients. Such optional ingredients include flavorants, preservatives (e.g., organic acids), colorants and so forth.

The noncarbonated beverage products can further comprise from 0 to about 110% of the U.S. Recommended Daily Allowance (RDA) of vitamins and minerals, provided that such vitamins and minerals do not substantially reduce ambient display times of the noncarbonated beverage products, and that such vitamins and minerals are chemically and physically compatible with the essential elements of the noncarbonated beverage products. Especially preferred are vitamin A, provitamins thereof (e.g., beta carotene), and ascorbic acid, although it is understood that other vitamins and minerals can also be used.

It is well known that certain food grade polyphosphates, such as those described herein, can help inhibit inactivation of the ascorbic acid while in the beverage product. It is also important to note that calcium, iron and magnesium fortification should be avoided since these polyvalent cations can bind to and inactive the polyphosphate component of the noncarbonated beverage products.

Gums, emulsifiers and oils can be included in the beverage products to affect texture and opacity. Typical ingredients include guar gum, xanthan, alginates, mono- and di-glycerides, lecithin, pectin, pulp, cottonseed oil, vegetable oil, food starches and weighting oils/agents. Esters and other flavor and essence oils can also be incorporated into the beverage products.

Preparation

The noncarbonated beverage products of the present invention can be prepared by conventional methods for formulating noncarbonated dilute juice beverages. Such conventional methods can involve hot packing or aseptic packaging operations, although such operations are not necessary for achieving the extended ambient display times described hereinbefore.

Methods for making dilute juice beverages, for example, are described in U.S. Pat. No. 4,737,375 to Nakel et al., which is incorporated herein by reference. Methods for making beverage products are also described by Woodroof and Phillips, *Beverages: Carbonated & Noncarbonated*, AVI Publishing Co.(rev. ed. 1981); and by Thorner and Herzberg, *Non-alcoholic Food Service Beverage Handbook*, AVI Publishing Co. (2nd ed. 1978).

One method for preparing the beverage products herein involves making a beverage concentrate, adding to it to a sugar syrup containing polyphosphate, and then trimming the mixture with water, sugar syrup, and beverage concentrate to obtain the requisite acidity and material composition. All added water used in such a preparation must have, or be adjusted to, the requisite hardness and, preferably adjusted to the requisite alkalinity levels. In such a method, the beverage concentrate can be prepared by admixing to water (correct alkalinity and hardness) an acidulant (e.g., citric acid), water soluble vitamins, flavorants including juice concentrate, and preservative. An oil in water emulsion, which provides opacity and texture to the beverage products, can be added to the concentrate. The sugar syrup for use in preparing the beverage products is separately prepared by adding sugar syrup (e.g., high fructose corn syrup) to water, and then adding ascorbic acid, polyphosphate and thickening agents to the syrup. Additional preservative can be added to the resulting sugar syrup. The sugar syrup and concentrate are combined to form a noncarbonated beverage product. The noncarbonated beverage product can be trimmed with small amounts of added water, sugar syrup and beverage concentrate to achieve the requisite acidity and composition of the noncarbonated beverage product of the present invention. It can then be pasteurized, packaged and stored. It is understood that other methods, e.g., the methods described hereinafter in the EXAMPLES section, can be used to prepare the noncarbonated beverage products herein.

The resulting noncarbonated beverage product, upon arrival at the supermarket, can be displayed on store shelves at ambient temperatures for at least about 10 days, typically for at least about 20 days. After the specified ambient display, the noncarbonated beverage product should be returned to cold storage. It is intended that the noncarbonated beverage product will be purchased by consumers during the ambient display and that the consumers will then store the beverage at home in a refrigerator.

The key aspect of the process of the present invention is admixing the requisite materials, in the requisite amounts, to achieve the noncarbonated beverage products of the present invention. Other well known and conventional variations of the above described beverage formulation technique can, therefore, be used to prepare the noncarbonated beverage products herein.

Test Method: Ambient Display Times

Ambient display times help define the noncarbonated beverage products of the present invention. These ambient display times correspond to the time period during which a noncarbonated beverage product at 20° C. can effectively resist microbial proliferation following a 10 cfu/ml inoculation with beverage spoilage microorganisms. The term "microbial proliferation" as used herein means a 100 fold increase or greater in the number of beverage spoilage microorganisms in a noncarbonated beverage product after an initial inoculation level of about 10 cfu/ml.

Ambient display times for a noncarbonated beverage product can be determined by the following method. Beverage products are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 20° C. for 21 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage product.

EXAMPLES

The following includes specific embodiments of the noncarbonated beverage products, and processes for preparing them, of the present invention. Ingredients for each product are admixed in the order in which they appear. Sodium hexametaphosphate for each product is admixed under high sheer mixing to insure solubility. Ambient display time for each product is at least about 20 days. These specific embodiments are illustrative of the invention and are not intended to be limiting of it.

Embodiment 1

Ingredients

Added Water about 85% hardness<30 ppm alkalinity<300 ppm

HFCS-55 about 13%

Fruit juice concentrate 0.7%
(as single strength juice 5.2%)

Potassium sorbate 650 ppm

Sodium hexametaphosphate 1000 ppm

Citric acid (titrate to beverage pH of 3.3)

Embodiment 2

Ingredients

Added Water about 85%
hardness<30 ppm
alkalinity<300 ppm

HFCS-55 about 13%

Tea solids 0.1%

Potassium sorbate 650 ppm

Sodium hexametaphosphate 1000 ppm

Citric acid (titrate to beverage pH of 3.3)

Comparative Data

Noncarbonated beverage samples (A–D) were prepared and tested for ambient display times. Each sample contained fructose solids (11.6° Brix) and 85% by weight of added water. Each sample also contained other minor ingredients which had substantially no effect on microbial proliferation. Test results and formula variables are set forth in Table 2 below.

TABLE 2

Noncarbonated Beverage Samples- Ambient Display Times

| Beverage Sample | Acidity (pH) | Potassium sorbate (ppm) | SHMP* (ppm) | Hardness (ppm) | Alkalinity (ppm) | Minimum 10-day ambient display |
|---|---|---|---|---|---|---|
| A | 3.14 | 650 | 0 | 30 | 150 | no |
| B | 3.05 | 0 | 1000 | 30 | 150 | no |
| C | 3.19 | 650 | 1000 | 120 | 150 | no |
| D* | 3.20 | 650 | 1000 | 30 | 150 | yes** |
| E* | 3.45 | 650 | 1000 | 30 | 600 | yes** |

*product of the present invention
**ambient display exceeded 20 days

It can be seen from the data set forth in Table 2 that Samples D and E had superior ambient display times (exceeded 20 days) as compared to all other tested samples (<10 day ambient display for Samples A–C). Marginally improved ambient display times were also noted for Sample D as compared to Sample E which shows that reduced alkalinity in the added water component, although not essential to the beverage products of the present invention, is preferred.

What is claimed is:

1. Noncarbonated beverage product with improved microbial stability, comprising:

(a) from about 100 ppm to about 400 ppm of a preservative selected from the group consisting of sorbic acid, benzoic acid, alkali metal salts thereof and mixtures thereof;
    (b) from about 300 ppm to about 900 ppm of a polyphosphate having the formula:

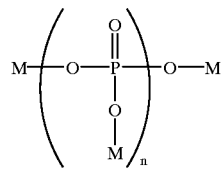

where n averages from about 3 to about 100 and each M is independently selected from the group consisting of sodium and potassium atoms;

(c) added water having from 0 ppm to about 60 ppm of hardness; and
    (d) a vitamin selected from the group consisting of vitamin A, provitamins thereof, and mixtures thereof, but wherein the beverage product is not fortified with calcium, magnesium, or iron;

wherein the resulting beverage product has a pH of from about 2.5 to about 4.5 and an ambient display time of at least about 10 days.

2. The beverage product of claim 1, wherein the preservative is potassium sorbate and the polyphosphate is sodium hexametaphosphate.

3. The beverage product of claim 2, comprising from about 200 ppm to about 400 ppm potassium sorbate.

4. The beverage product of claim 1, further comprising from about 0.1% to about 20% by weight of a carbohydrate sweetener selected from the group consisting of fructose, maltose, sucrose, glucose, invert sugars and mixtures thereof.

5. Noncarbonated beverage product with improved microbial stability, comprising:

(a) from about 100 ppm to about 1000 ppm of a preservative selected from the group consisting of sorbic acid, benzoic acid, alkali metal salts thereof and mixtures thereof;
    (b) from about 300 ppm to about 900 ppm of a polyphosphate having the formula:

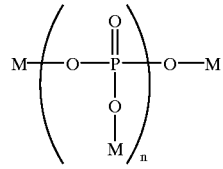

where n averages from about 3 to about 100 and each M is independently selected from the group consisting of sodium and potassium atoms;

(c) added water having from 0 ppm to about 60 ppm of hardness; and
    (d) a vitamin selected from the group consisting of vitamin A, provitamins thereof, and mixtures thereof, but wherein the beverage product is not fortified with calcium, magnesium, or iron;

wherein the resulting beverage product has a pH of from about 2.5 to about 4.5 and an ambient display time of at least about 10 days.

6. The beverage product of claim 5, wherein the preservative is potassium sorbate and the polyphosphate is sodium hexametaphosphate.

7. The beverage product of claim 6, further comprising from about 0.1% to about 20% by weight of a carbohydrate sweetener selected from the group consisting of fructose, maltose, sucrose, glucose, invert sugars and mixtures thereof.

8. Noncarbonated beverage product with improved microbial stability, comprising:
   (a) from about 400 ppm to about 650 ppm of a preservative selected from the group consisting of sorbic acid, benzoic acid, alkali metal salts thereof and mixtures thereof;
   (b) from about 900 ppm to about 3000 ppm of a polyphosphate having the formula:

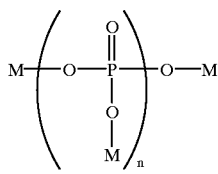

where n averages from about 3 to about 100 and each M is independently selected from the group consisting of sodium and potassium atoms;
   (c) added water having from 0 ppm to about 60 ppm of hardness; and
   (d) a vitamin selected from the group consisting of vitamin A, provitamins thereof, and mixtures thereof, but wherein the beverage product is not fortified with calcium, magnesium, or iron;
wherein the resulting beverage product has a pH of from about 2.5 to about 4.5 and an ambient display time of at least about 10 days.

9. The beverage product of claim 8, wherein the preservative is potassium sorbate and the polyphosphate is sodium hexametaphosphate.

10. The beverage product of claim 9 comprising from about 1000 ppm to about 1500 ppm sodium hexametaphosphate.

11. The beverage product of claim 8, further comprising from about 0.1% to about 20% by weight of a carbohydrate sweetener selected from the group consisting of fructose, maltose, sucrose, glucose, invert sugars and mixtures thereof.

12. A method of preserving a noncarbonated beverage product comprising combining:
   (a) from about 100 ppm to about 400 ppm of a preservative selected from the group consisting of sorbic acid, benzoic acid, alkali metal salts thereof and mixtures thereof;
   (b) from about 300 ppm to about 900 ppm of a polyphosphate having the formula:

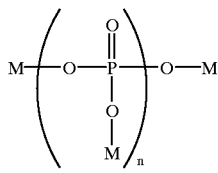

where n averages from about 3 to about 100 and each M is independently selected from the group consisting of sodium and potassium atoms;
   (c) water having from 0 ppm to about 60 ppm of hardness; and
   (d) a vitamin selected from the group consisting of vitamin A, provitamins thereof, and mixtures thereof, but wherein none of calcium, magnesium, or iron are combined into the beverage product;
wherein the resulting beverage product has a pH of from about 2.5 to about 4.5 and an ambient display time of at least about 10 days.

13. A method according to claim 12 wherein the preservative is potassium sorbate and the polyphosphate is sodium hexametaphosphate.

14. A method according to claim 13, wherein the resulting beverage product comprises from about 200 ppm to about 400 ppm potassium sorbate.

15. A method according to claim 12, further comprising combining from about 0.1% to about 20% by weight of a carbohydrate sweetener selected from the group consisting of fructose, maltose, sucrose, glucose, invert sugars and mixtures thereof.

16. A method of preserving a noncarbonated beverage product comprising combining:
   (a) from about 100 ppm to about 1000 ppm of a preservative selected from the group consisting of sorbic acid, benzoic acid, alkali metal salts thereof and mixtures thereof;
   (b) from about 300 ppm to about 900 ppm of a polyphosphate having the formula:

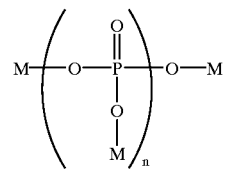

where n averages from about 3 to about 100 and each M is independently selected from the group consisting of sodium and potassium atoms;
   (c) water having from 0 ppm to about 60 ppm of hardness; and
   (d) a vitamin selected from the group consisting of vitamin A, provitamins thereof, and mixtures thereof, but wherein none of calcium, magnesium, or iron are combined into the beverage product;
wherein the resulting beverage product has a pH of from about 2.5 to about 4.5 and an ambient display time of at least about 10 days.

17. A method according to claim 16, wherein the preservative is potassium sorbate and the polyphosphate is sodium hexametaphosphate.

18. A method according to claim 17, further comprising combining from about 0.1% to about 20% by weight of a carbohydrate sweetener selected from the group consisting of fructose, maltose, sucrose, glucose, invert sugars and mixtures thereof.

19. A method of preserving a noncarbonated beverage product comprising combining:
   (a) from about 400 ppm to about 1000 ppm of a preservative selected from the group consisting of sorbic acid, benzoic acid, alkali metal salts thereof and mixtures thereof;
   (b) from about 900 ppm to about 3000 ppm of a polyphosphate having the formula:

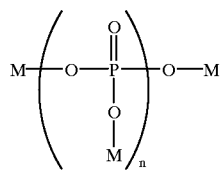

where n averages from about 3 to about 100 and each M is independently selected from the group consisting of sodium and potassium atoms;

(c) water having from 0 ppm to about 60 ppm of hardness; and (d) a vitamin selected from the group consisting of vitamin A, provitamins thereof, and mixtures thereof, but wherein none of calcium, magnesium, or iron are combined into the beverage product;

wherein the resulting beverage product has a pH of from about 2.5 to about 4.5 and an ambient display time of at least about 10 days.

20. A method according to claim 19, wherein the preservative is potassium sorbate and the polyphosphate is sodium hexametaphosphate.

21. A method according to claim 20, wherein the resulting beverage product comprises from about 1000 ppm to about 1500 ppm sodium hexametaphosphate and from about 650 ppm to about 750 ppm potassium sorbate.

22. A method according to claim 19, further comprising combining from about 0.1% to about 20% by weight of a carbohydrate sweetener selected from the group consisting of fructose, maltose, sucrose, glucose, invert sugars and mixtures thereof.

* * * * *